(12) United States Patent
Komiyama

(10) Patent No.: US 10,560,972 B2
(45) Date of Patent: Feb. 11, 2020

(54) INFORMATION PROCESSING APPARATUS, AND CONTROL METHOD THEREOF

(71) Applicant: CANON KABUSHIKI KAISHA, Tokyo (JP)

(72) Inventor: Tomoaki Komiyama, Kamakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 15/969,840

(22) Filed: May 3, 2018

(65) Prior Publication Data

US 2018/0332633 A1 Nov. 15, 2018

(30) Foreign Application Priority Data

May 12, 2017 (JP) .................................. 2017-095846
Feb. 13, 2018 (JP) .................................. 2018-023409

(51) Int. Cl.
| | | |
|---|---|---|
| *H04W 76/10* | (2018.01) | |
| *H04W 8/00* | (2009.01) | |
| *H04N 9/31* | (2006.01) | |
| *H05B 37/02* | (2006.01) | |
| *G06F 3/0482* | (2013.01) | |
| *H04W 76/30* | (2018.01) | |
| *G06F 3/0484* | (2013.01) | |

(52) U.S. Cl.
CPC .......... *H04W 76/10* (2018.02); *H04N 9/3179* (2013.01); *H04W 8/005* (2013.01); *H05B 37/0272* (2013.01); *G06F 3/0482* (2013.01); *G06F 3/04847* (2013.01); *H04W 76/30* (2018.02)

(58) Field of Classification Search
CPC ..... H04W 76/10; H04W 76/30; H04W 8/005; H04N 9/3179
See application file for complete search history.

(56) References Cited

U.S. PATENT DOCUMENTS

| | | | |
|---|---|---|---|
| 2015/0370456 A1* | 12/2015 | Kobayashi | A63F 13/23 463/33 |
| 2016/0357357 A1* | 12/2016 | Lemay | G06F 3/0481 |
| 2017/0352248 A1 | 12/2017 | Shimizu et al. | |
| 2018/0309801 A1* | 10/2018 | Rathod | H04L 51/04 |

FOREIGN PATENT DOCUMENTS

| | | |
|---|---|---|
| JP | 2009-296661 A | 12/2009 |
| JP | 2012-186118 A | 9/2012 |
| WO | 2016/104191 A1 | 6/2016 |

* cited by examiner

*Primary Examiner* — Wei Zhao
(74) *Attorney, Agent, or Firm* — Cowan, Liebowitz & Latman, P.C.

(57) ABSTRACT

An information processing apparatus that is capable of externally controlling a projection apparatus, the information processing apparatus comprises a communication unit configured to perform communication with the projection apparatus, an acquiring unit configured to acquire function information of the projection apparatus from the projection apparatus via the communication unit, a presenting unit configured to present the function information of the projection apparatus acquired by the acquiring unit, and a control unit configured to control the presenting unit so as to present an indication of whether the projection apparatus is operating with a projection function or with a lighting function based on the function information of the projection apparatus acquired by the acquiring unit.

21 Claims, 12 Drawing Sheets

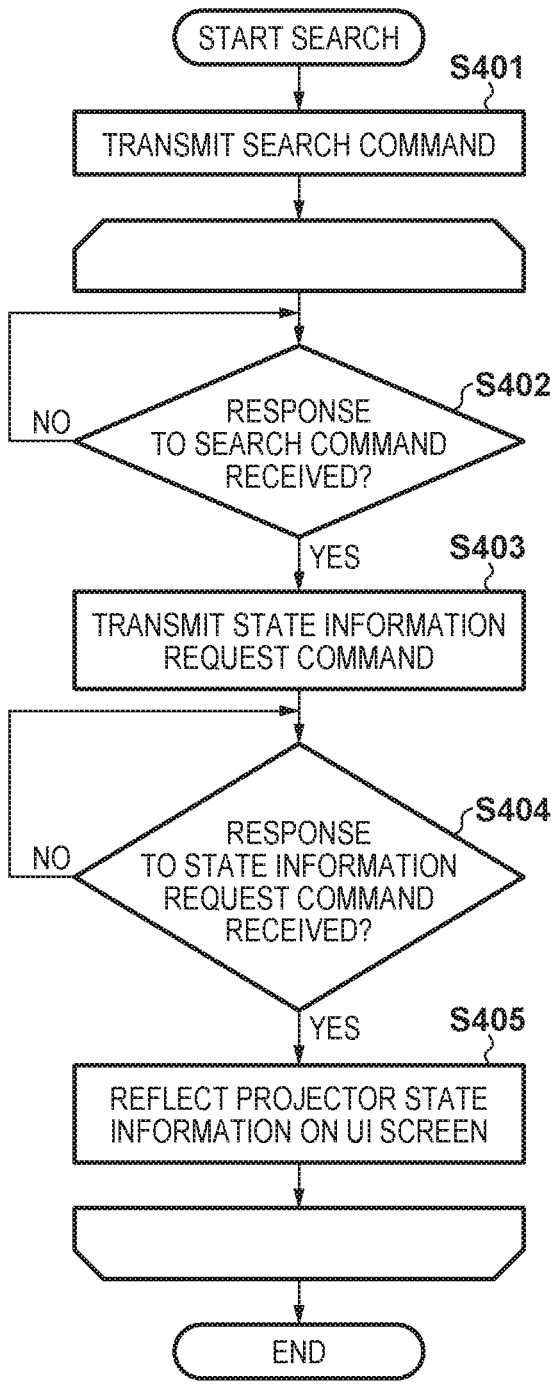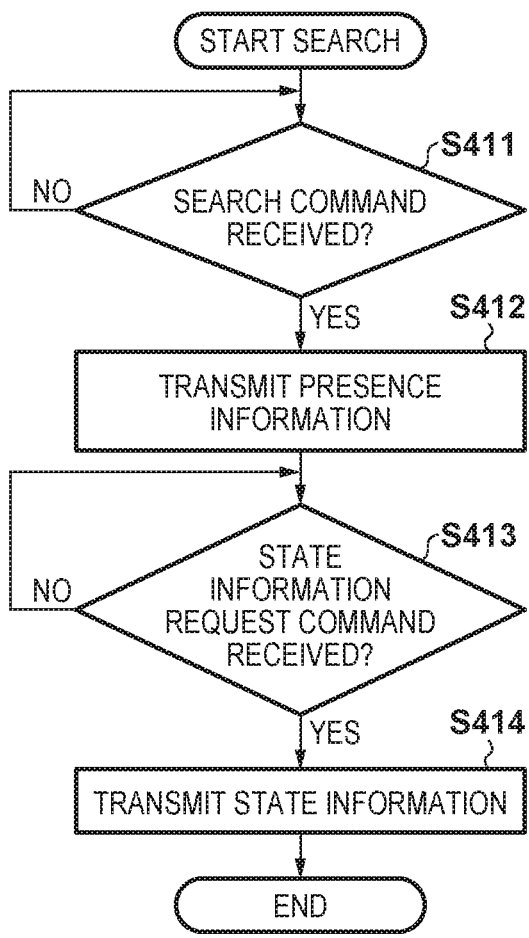
FIG. 4A
FIG. 4B

FIG. 7A

[LIST OF DETECTED PROJECTORS]

| NAME | MODE |
|------|------|
| AAA | |
| BBB | |
| CCC | |
| DDD | |

SEARCH

FIG. 7B

[LIST OF DETECTED PROJECTORS]

| NAME | MODE |
|------|------|
| AAA | |
| BBB | |
| CCC | |

SEARCH

FIG. 7C

[LIST OF DETECTED PROJECTORS]

| NAME | MODE |
|------|------|
| AAA | |
| DDD | |
| EEE | |
| BBB | |
| CCC | |
| FFF | |

SEARCH

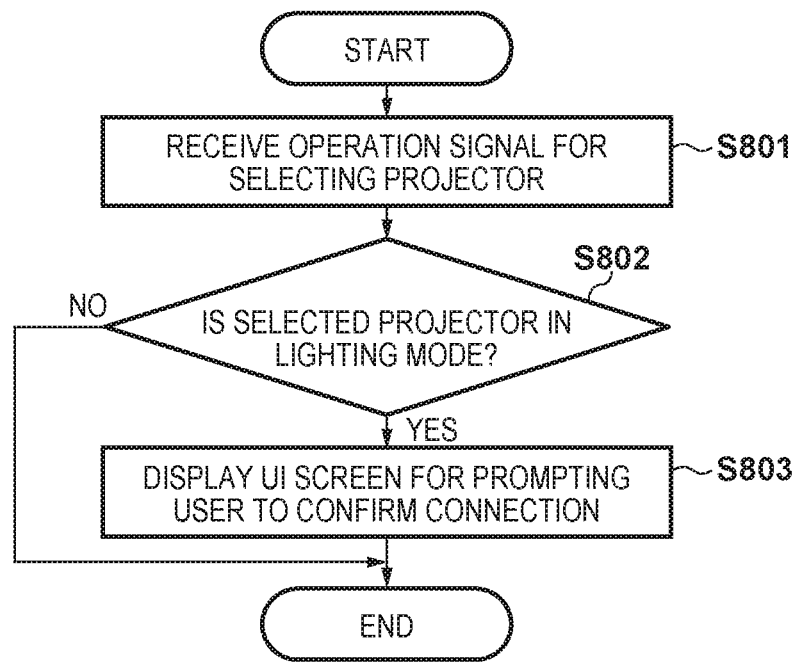
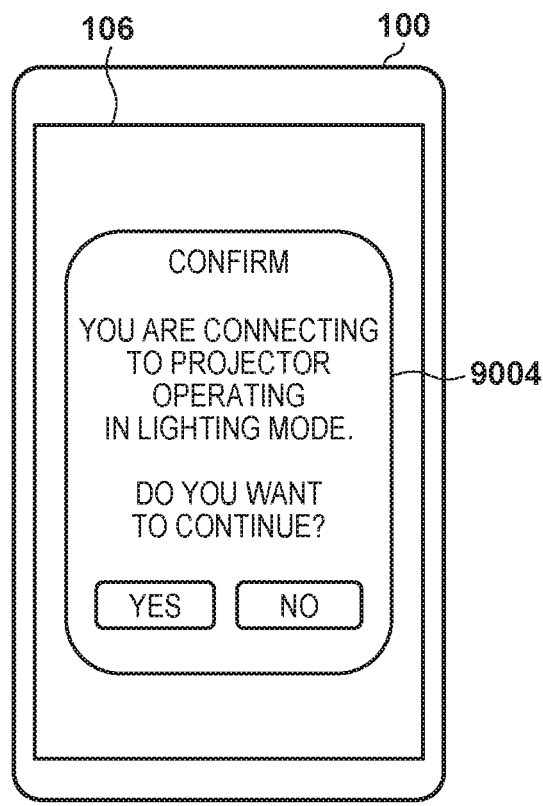

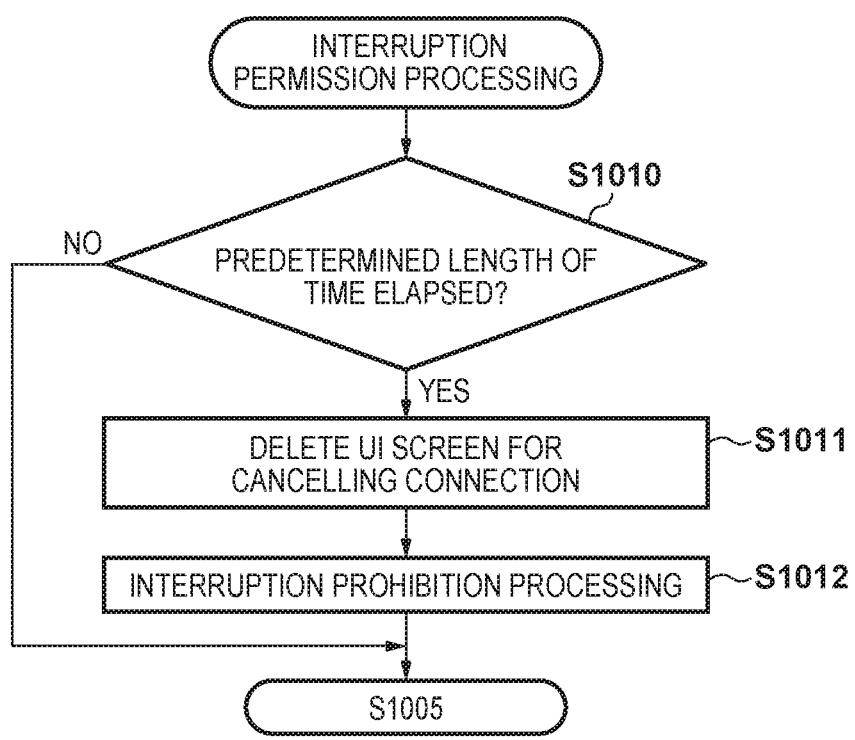

INFORMATION PROCESSING APPARATUS, AND CONTROL METHOD THEREOF

BACKGROUND OF THE INVENTION

Field of the Invention

The present invention relates to a technique for externally controlling a projection apparatus that has a projection function and a lighting function.

Description of the Related Art

Japanese Patent Laid-Open No. 2012-186118 and WO 2016/104191 disclose apparatuses that have a lighting function and a projection function. By installing such an apparatus at the same position as existing lighting equipment, the apparatus can project a video image while performing the lighting function. Also, Japanese Patent Laid-Open No. 2009-296661 discloses a technique in which an information processing apparatus such a computer and a projection apparatus such as a projector are connected so as to be capable of performing communication with each other, then, after a connection has been established therebetween, image data is transmitted from the information processing apparatus to the projection apparatus, and the projection apparatus projects the image data.

A configuration is conceivable in which such a projection apparatus that has a projection function and a lighting function as described above is externally controlled by using an information processing apparatus. With this configuration, because the projection apparatus is not directly operated, the user may not be able to easily recognize which function the projection apparatus is currently performing. In this case, a malfunction may occur as a result of the user connecting the information processing apparatus to the projection apparatus that is operating with a function in which the connection should not be performed. For example, if the user connects the information processing apparatus to the projection apparatus without recognizing that the projection apparatus is operating in its lighting mode, the lighting function may be terminated and switched to the projection function contrary to the user's intention.

SUMMARY OF THE INVENTION

The present invention has been made in consideration of the aforementioned problems, and provides an information processing apparatus that is capable of externally controlling a projection apparatus that has a projection function and a lighting function, wherein it is possible to present to the user an indication of which function the projection apparatus is currently performing.

In order to solve the aforementioned problems, the present invention provides an information processing apparatus that is capable of externally controlling a projection apparatus, the information processing apparatus comprising: a communication unit configured to perform communication with the projection apparatus; an acquiring unit configured to acquire function information of the projection apparatus from the projection apparatus via the communication unit; a presenting unit configured to present the function information of the projection apparatus acquired by the acquiring unit; and a control unit configured to control the presenting unit so as to present an indication of whether the projection apparatus is operating with a projection function or with a lighting function based on the function information of the projection apparatus acquired by the acquiring unit.

In order to solve the aforementioned problems, the present invention provides an information processing apparatus that is capable of externally controlling a projection apparatus, the information processing apparatus comprising: a communication unit configured to perform communication with the projection apparatus; an acquiring unit configured to acquire function information of the projection apparatus from the projection apparatus via the communication unit; and a display control unit configured to display, on a display unit, an operation mode in which the projection apparatus is operating based on the function information of the projection apparatus acquired by the acquiring unit, the operation mode being one of a plurality of operation modes including a projection mode in which the projection apparatus uses its projection function and a lighting mode in which the projection apparatus uses its lighting function.

In order to solve the aforementioned problems, the present invention provides a control method of an information processing apparatus that is capable of externally controlling a projection apparatus, the method comprising: acquiring function information of the projection apparatus via a communication unit from the projection apparatus; presenting the acquired function information of the projection apparatus; performing control based on the acquired function information of the projection apparatus so as to present an indication of whether the projection apparatus is operating with a projection function or a lighting function.

In order to solve the aforementioned problems, the present invention provides a control method of an information processing apparatus that is capable of externally controlling a projection apparatus, the method comprising: acquiring function information of the projection apparatus via a communication unit from the projection apparatus; and displaying, on a display unit, an operation mode in which the projection apparatus is operating based on the acquired function information of the projection apparatus, the operation mode being one of a plurality of operation modes including a projection mode in which the projection apparatus uses its projection function and a lighting mode in which the projection apparatus uses its lighting function.

In order to solve the aforementioned problems, the present invention provides a non-transitory computer-readable storage medium storing a program for causing a computer to function as an information processing apparatus that is capable of externally controlling a projection apparatus, the information processing apparatus comprising: a communication unit configured to perform communication with the projection apparatus an acquiring unit configured to acquire function information of the projection apparatus from the projection apparatus via the communication unit; a presenting unit configured to present the function information of the projection apparatus acquired by the acquiring unit; and a control unit configured to control the presenting unit so as to present an indication of whether the projection apparatus is operating with a projection function or with a lighting function based on the function information of the projection apparatus acquired by the acquiring unit.

In order to solve the aforementioned problems, the present invention provides a non-transitory computer-readable storage medium storing a program for causing a computer to function as an information processing apparatus that is capable of externally controlling a projection apparatus, the information processing apparatus comprising: a communication unit configured to perform communication with the projection apparatus; an acquiring unit configured to acquire function information of the projection apparatus from the projection apparatus via the communication unit; and a display control unit configured to display, on a display unit, an operation mode in which the projection apparatus is operating based on the function information of the projection apparatus acquired by the acquiring unit, the operation mode being one of a plurality of operation modes including a projection mode in which the projection apparatus uses its projection function and a lighting mode in which the projection apparatus uses its lighting function.

According to the present invention, it is possible to provide an information processing apparatus that is capable of externally controlling a projection apparatus that has a projection function and a lighting function, wherein it is possible to present to the user an indication of which function the projection apparatus is currently performing, and thus the user can easily perceive the operation state of the projection apparatus.

Further features of the present invention will become apparent from the following description of exemplary embodiments (with reference to the attached drawings).

BRIEF DESCRIPTION OF THE DRAWINGS

FIG. 4A is a flowchart illustrating connection processing performed by a smartphone according to a first embodiment.

FIG. 4B is a flowchart illustrating connection processing performed by a projector according to the first embodiment.

FIGS. 7A to 7C are diagrams showing an example of a UI screen of the smartphone according to the first embodiment displayed when connected to projectors.

FIG. 8 is a flowchart illustrating UI screen display processing performed by a smartphone according to a second embodiment when connected to a projector.

FIG. 9 is a diagram showing an example of a UI screen of the smartphone according to the second embodiment displayed when connected to the projector.

FIGS. 10A and 10B show a flowchart illustrating UI screen display processing performed by a smartphone according to a third embodiment when connected to a projector.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

Hereinafter, a first embodiment will be described.

Figure 1:
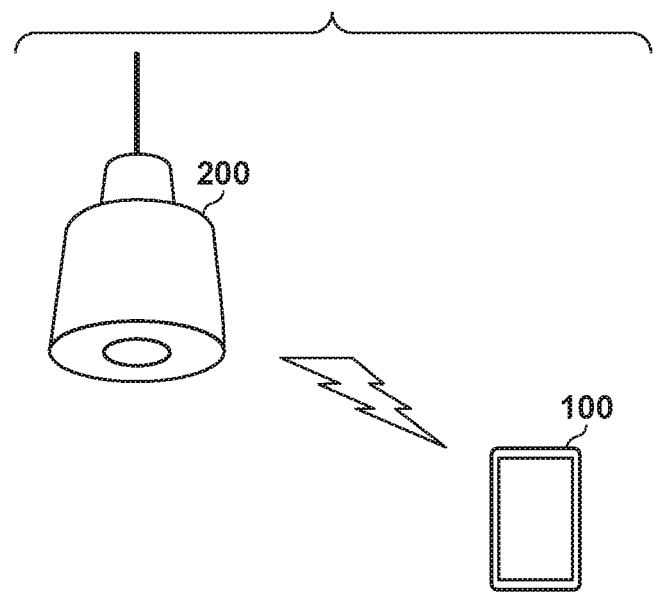
FIG. 1 is a configuration diagram of a system that includes a smartphone and a projector according to an embodiment of the present invention.

FIG. 1 is a configuration diagram of a system according to the present embodiment. In the system according to the present embodiment, a projector 200 that has a projection function and a lighting function and serves as a projection apparatus can be remotely controlled from the outside with the use of an application installed on a smartphone 100 that serves as an information processing apparatus. The projector 200 can be switched between a projection mode that corresponds to the projection function and a lighting mode that corresponds to the lighting function with the use of the application installed on the smartphone 100.

In the present embodiment, an example will be described in which the projector 200 has the projection function and the lighting function. However, the projector 200 may have, not only the lighting function, but also an audio output function of outputting audio by using a speaker or the like, a circulator function of circulating air by using a fan or the like, an air conditioning function of adjusting the temperature and humidity of air, an air purification function of purifying air, or any combination of these functions. Also, the lighting function is not limited to an ordinary lighting function such as a spotlight, and various types of lighting can be used.

FIG. 1 shows only one smartphone 100 and only one projector 200, but it is also possible to configure a network by using one smartphone 100 and a plurality of projectors 200.

Hereinafter, an embodiment will be described in which a smartphone 100 searches for a plurality of projectors 200 that are present in the same network as the smartphone 100, and retrieved results are presented to the user. Then, a session is established with one of the projectors selected by the user according to a predetermined protocol, and image data is transferred to the projector so as to project the image data.

Description of Smartphone

The configuration and functions of the smartphone 100 according to the present embodiment will be described with reference to FIG. 2A.

Figure 2A:
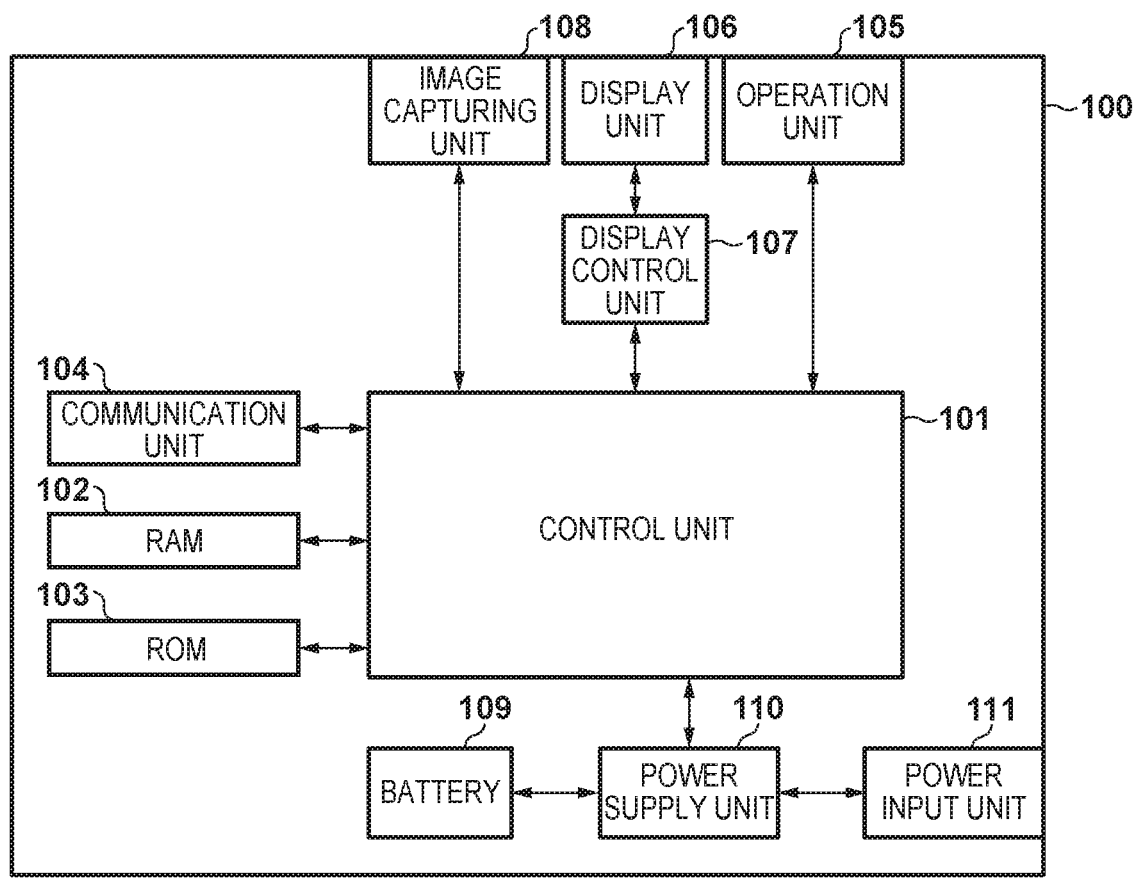
FIG. 2A is a block diagram showing an internal configuration of the smartphone according to the embodiment of the present invention.

In FIG. 2A, the smartphone 100 includes a control unit 101, a RAM 102, a ROM 103, a communication unit 104, an operation unit 105, a display unit 106, a display control unit 107, an image capturing unit 108, a battery 109, a power supply unit 110, and a power input unit 111.

The control unit 101 is a central processing unit (CPU) that performs control on the constituent blocks of the smartphone 100. The RAM 102 is a volatile memory that functions as a work memory and temporarily stores a control program and data. Also, the RAM 102 is used as a buffer memory that temporarily stores image data captured by the image capturing unit 108, which will be described later, or as a memory for displaying images on the display unit 106, which will be described later. The ROM 103 is a non-volatile memory that stores a control program in which processing procedures of the control unit 101 are written. As used herein, the control program refers to a program for executing processing illustrated in the flowcharts, which will be described later. The control unit 101 implements the functions of an application, which will be described later, by executing the control program stored in the ROM 103. Instead of the control unit 101 controlling the entire apparatus, the processing may be shared between a plurality of hardware units so as to control the entire apparatus. This applies to other hardware units of a projector 200, which will be described later, and processing may be shared between the plurality of hardware units.

Also, the ROM 103 stores an operating system (OS) that is basic software executed by the control unit 101, and an application that implements application functions by working in cooperation with the OS. Communication processing of the smartphone 100 according to the present embodiment is implemented by reading software provided by the application. It is assumed here that the application includes software for using the basic functions of the OS installed on the smartphone 100. A configuration is also possible in which the OS of the smartphone 100 includes software for implementing the processing according to the present embodiment.

The communication unit 104 is an interface for connecting to an external apparatus such as a projector 200, which will be described later. The smartphone 100 according to the present embodiment can perform data transmission and reception with respect to the external apparatus via the communication unit 104. Also, the communication unit 104 can perform data transmission and reception with respect to an external apparatus such as a server via a public line such as 3G/LTE, or a communication network such as the Internet or an intranet. In the present embodiment, the communication unit 104 includes an interface for communicating with an external apparatus through a wireless LAN according to the specification of IEEE 802.11. The control unit 101 implements wireless communication with an external apparatus by controlling the communication unit 104. The communication scheme is not limited to the wireless LAN, and the communication unit 104 may include, for example, an infrared communication interface, or a wireless communication interface such as a wireless USB.

The operation unit 105 is composed of operation members for receiving various types of operations from the user such as various types of switches, buttons, and a touch panel that is unitarily provided on a display panel of the display unit 106, which will be described later. The operation unit 105 includes a power button, a home button, and a touch panel, and the home button is configured to, when pressed by the user, close an application running on the smartphone and display, on the display unit 106, which will be described later, a home screen that allows the user to select another application.

The display unit 106 displays captured images, and a graphical user interface (GUI) for interactive operation that includes characters, graphics, symbols, and the like. The display unit 106 is a display device such as, for example, a liquid crystal display, or an organic EL display.

The display control unit 107 outputs, to the display unit 106, control signals for displaying a captured image, a user interface (UI) screen for operating projectors 200, image icons for operation, and the like.

The image capturing unit 108 includes a lens group that includes a zoom lens and a focus lens, and a shutter that has an aperture control function. Also, the image capturing unit 108 includes an image sensor that is a CCD or CMOS that coverts a subject image to an electric signal, and an A/D converter that converts an analog image signal output from the image sensor to a digital signal. Under control of the control unit 101, the image capturing unit 108 converts, by using the image sensor, subject image light imaged by the lens included in the image capturing unit 108 to an electric signal, performs noise reduction processing and the like, and outputs image data in the form of a digital signal.

The battery 109 may be a primary battery such as an alkaline battery or a lithium battery, or a secondary battery such as a NiCd battery, a NiMH battery or a lithium ion battery, or the like, and transmits power to the power supply unit 110, which will be described later. The battery 109 may be incorporated in the smartphone 100, or may be configured to be attachable and detachable with respect to the smartphone 100. The power supply unit 110 controls supply of power transmitted from the battery 109 or the power input unit 111, which will be described later, to the constituent blocks of the smartphone 100. The power input unit 111 receives power from a commercial (AC) power supply, or the like, rectifies the power to a predetermined voltage, and transmits the power to the power supply unit 110.

In the present embodiment, a smartphone that is a kind of mobile phone is used as the information processing apparatus, but the information processing apparatus may be a mobile device such as a tablet device, a personal computer (PC), or the like. Alternatively, the information processing apparatus may be a glass-like terminal or a watch-like terminal that has a communication function.

Operations of Smartphone

Next is a description of operations performed by the smartphone 100 according to the present embodiment during normal state.

When an operation signal for turning on power is input via the operation unit 105 by a user operation, the control unit 101 controls the power supply unit 110 so as to supply power to each block and bring the block into a standby state. After power has been turned on, the control unit 101 writes the control program stored in the ROM 103 into the RAM 102, and performs initialization processing on each block in accordance with the control program. In the initialization processing, the control unit 101 controls the display control unit 107 so as to display image data for an idle screen on the display unit 106.

The smartphone 100 according to the present embodiment can acquire, with the use of the control unit 101, an application program that runs on the OS from the Internet or the like via the communication unit 104, and execute the application program. Also, the control unit 101 can perform communication with an external apparatus via the communication unit 104 in accordance with the application program. For example, the control unit 101 may also, after processing for establishing a connection to a projector 200 has been performed, transfer image data for display from the smartphone 100 to the projector 200 such that the projector 200 projects the image data for display. On the other hand, when an operation signal for turning off power is input via the operation unit 105 by a user operation, the control unit 101 stores settings data and the like written in the RAM 102 into the ROM 103, and controls each block to perform termination processing.

Description of Projector

Next, the configuration and functions of the projector 200 according to the present embodiment will be described with reference to FIG. 2B.

Figure 2B:
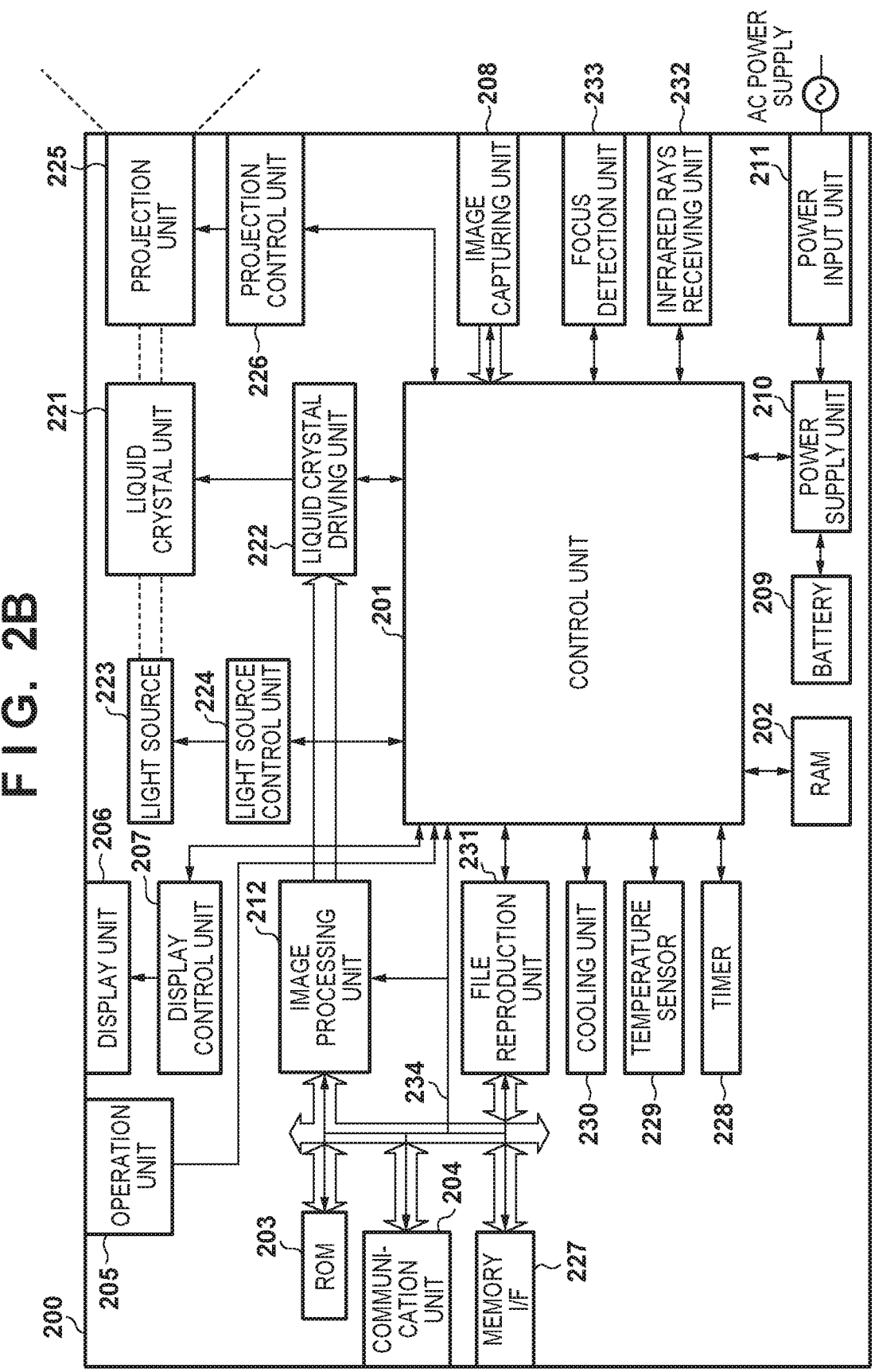
FIG. 2B is a block diagram showing an internal configuration of the projector according to the embodiment of the present invention.

In FIG. 2B, the projector 200 includes a control unit 201, a RAM 202, a ROM 203, a communication unit 204, an operation unit 205, a display unit 206, a display control unit 207, an image capturing unit 208, a battery 209, a power supply unit 210, and a power input unit 211. The basic functions of the aforementioned constituent blocks are the same as those of the smartphone 100, and thus a detailed description is omitted here.

The communication unit 204 is configured to receive control signals and video image data from an external apparatus such as the smartphone 100, and can use a communication scheme such as a wireless LAN or a wired LAN.

The ROM 203 may be a semiconductor memory, a hard disk, or the like that is incorporated in the projector 200 or is attachable and detachable with respect to the projector 200. The display unit 206 displays the state of the projector 200, a warning, or the like. The image capturing unit 208 captures a screen (not shown).

Also, the projector 200 includes an image processing unit 212, a liquid crystal unit a liquid crystal driving unit 222, a light source 223, a light source control unit 224, a projection unit 225, and a projection control unit 226.

The image processing unit 212 performs processing on video image data read out from the ROM 203, video image data received by the communication unit 204, and video image data read from a memory I/F 227, which will be described later, so as to change the number of frames, the number of pixels, the image shape, and the like, and transmits the processed data to the liquid crystal driving unit 222. The control unit 201 may execute the same processing as that performed by the image processing unit 212. The image processing unit 212 may execute functions such as frame thinning processing, frame interpolation processing, resolution conversion processing, image synthesizing processing, geometric correction processing (keystone correction processing, curved surface correction processing), and panel correction.

The liquid crystal unit 221 includes three liquid crystal panels to which liquid crystal elements of R, G, and B are respectively assigned, and forms a video image by causing each liquid crystal panel to transmit light. The liquid crystal driving unit 222 adjusts the transmittance of each liquid crystal element by controlling the voltage applied to the liquid crystals of the pixels of the liquid crystal elements of the R, G and B liquid crystal panels based on the video image data processed by the image processing unit 212.

The light source 223 applies light to the liquid crystal unit 221. The light source control unit 224 controls the light source 223 between on and off, as well as the amount of light of the light source 223.

The projection unit 225 projects the video image that has passed through the liquid crystal unit 221 onto a screen (not shown). The projection unit 225 includes a zoom lens, a focus lens, and a light diffusion unit (all not show that are provided on an optical path. Under control of the projection control unit 226, which will be described later, the projection unit 225 can transmit light without diffusing the light, or transmit light while diffusing the light. As the light diffusion unit, it is possible to use a polymer dispersed liquid crystal (PDLC) or a reverse PDLC that can control light transmission and diffusion by using an applied voltage. Alternatively, it is also possible to use a movable optical member, such as a diffuser plate, that can be inserted into and retracted from the optical path.

The projection control unit 226 controls the zoom lens and the focus lens of the projection unit 225 so as to perform zoom factor adjustment and focus adjustment, as well as control of the light diffusion unit.

Also, the projector 200 includes a memory I/F 227, a timer 228, a temperature sensor 229, a cooling unit 230, a file reproduction unit 231, an infrared rays receiving unit 232, and a focus detection unit 233.

The memory I/F 227 is an interface to which a memory device such as a USB memory that is connected, and that reads and writes data. A pointing device, a keyboard or the like may be connected to the memory I/F 227. The timer 228 measures lengths of time required to perform various types of control, as well as the time of a built-in clock. The temperature sensor 229 measures the temperatures of the liquid crystal unit 221, the light source 223, and the like. The cooling unit 230 includes a fan and a heatsink, and dissipates heat generated in the projector 200 to the outside for cooling.

The file reproduction unit 231 is controlled by the control unit 201, and decodes an encoded video image file and the like. The infrared rays receiving unit 232 receives infrared rays from a remote controller (not shown) or other electronic devices, and transmits an operation signal to the control unit 201. The focus detection unit 233 detects a focal distance by detecting the distance between the projector 200 and the screen (not shown).

The control unit 201 is connected to other blocks with an internal bus 234, and can access the blocks such as transmitting and receiving control signals and data with respect to the blocks.

The present embodiment uses a liquid crystal projector as the projection apparatus, but the projection apparatus is not limited thereto, and it is also possible to use a digital light processing (DLP) projector, and a LCMOS (reflective liquid crystal element) projector.

Operations of Projector

Next is a description of operations performed by the projector 200 according to the present embodiment during normal state.

When an operation signal for turning on power is input via the operation unit 205 by a user operation, the control unit 201 controls the power supply unit 210 so as to supply power to each block, and causes the projector 200 to transition to a standby mode (standby state). In the standby mode, the infrared rays receiving unit 232 and the communication unit 204 are ready for operation, and the projector 200 is in a receptive state in which the projector 200 can receive an operation signal from an external apparatus such as the smartphone 100.

Next, when an operation signal for transitioning to the projection mode is input via the operation unit 205 by a user operation, the control unit 201 controls the power supply unit 210 so as to supply power to the blocks that are required to perform a projection operation. Then, after power has been input to the blocks, the control unit 201 controls the light source control unit 224 to start light emission from the light source 223. Next, the control unit 201 controls the projection control unit 226 based on focus information and the like obtained by the focus detection unit 233 so as to adjust the projection state of the projection unit 225. The projection control unit 226 performs control so as to drive the zoom lens and the focus lens of the projection unit 225 and to image projection light onto the screen (not shown). Then, the preparation operation for projection ends.

In the lighting mode, the projector 200 can function as a lighting apparatus by causing the projection control unit 226 to control the light diffusion unit of the projection unit 225 to project and diffuse white light. The lighting method is not limited thereto, and it is also possible to illuminate the projection surface as a result of projecting, for example, a white image.

Also, upon receiving an operation signal for turning off power via the operation unit 205, the control unit 201 transmits a control signal for performing termination processing to each block. Then, when the preparation for the termination processing ends, the power supply unit 210 sequentially terminates the supply of power to the blocks other than those that need to be operated during the standby state, and causes the projector 200 to transition to the standby mode.

Figure 3:
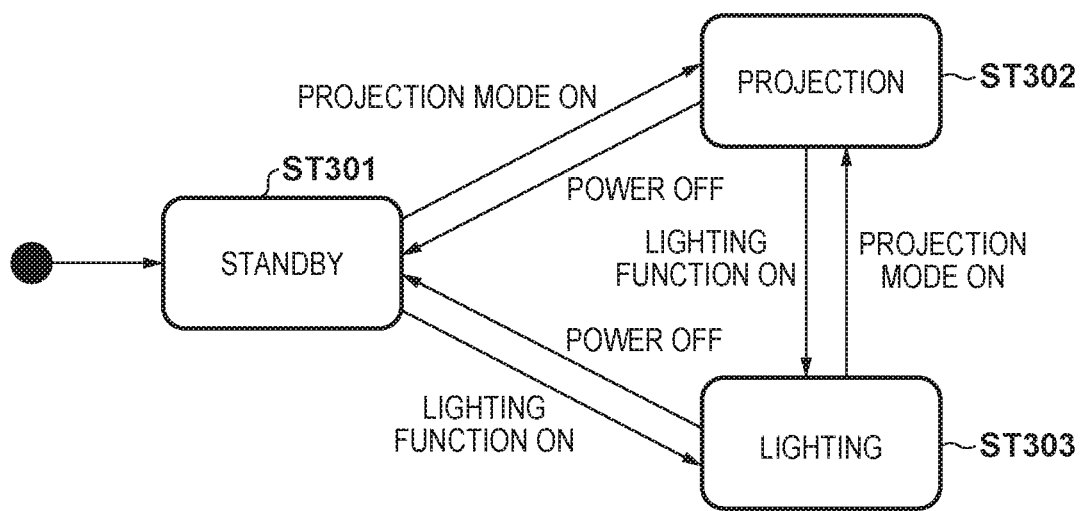
FIG. 3 is a diagram showing transitions between operation modes in the projector according to the embodiment of the present invention.

The state transition to each operation mode of the projector 200 according to the present embodiment will now be described with reference to the state transition diagram shown in FIG. 3. As described above, when power is turned on, the projector 200 transitions to a standby mode indicated by ST 301. Next, when an operation signal for transitioning to a projection mode is input, the projector 200 transitions to a projection mode indicated by ST 302. Also, during the standby mode ST 301, when an operation signal for transitioning to a lighting mode is input, the projector 200 transitions to a lighting mode indicated by ST 303. The lighting mode and the projection mode can be switched to each other, and the transition can be implemented by a user operation. Also, when an operation signal for turning of power is input during the projection mode or the lighting mode, the mode is transitioned to the standby mode. The operation signals described above can be input via the operation unit 205 by the user directly operating the projector 200, or by the user operating the smartphone 100 and the communication unit 204 receiving a signal transmitted by the user operation.

As described above, the projector 200 according to the present embodiment can transition to any one of the standby mode, the projection mode, and the lighting mode in response to a user operation. When the projector transitions to the lighting mode, the projector 200 controls the light diffusion unit provided in the projection unit 225 so as to diffuse light emitted from the light source 223.

UI Screen Display Control

Next, UI screen display control performed by the smartphone 100 according to the present embodiment will be described with reference to FIGS. 4 to 6.

Hereinafter, a sequence performed by the smartphone 100 and a sequence performed by the projector 200 when the smartphone 100 searches for a plurality of projectors that are present on the same network as the smartphone 100. The smartphone 100 and the projector 200 according to the present embodiment have the same configurations as those shown in FIGS. 2A and 2B.

FIGS. 4A and 4B respectively show a sequence performed by the smartphone 100 and a sequence performed by the projector 200 when the smartphone 100 searches for a plurality of projectors 200 that belong to the same subnet range, and displays the result of search on the display unit 106. Here, it is assumed that the smartphone 100 and the projectors 200 are in a state in which they can communicate with each other, and projector search, image data projection, remote control, and the like can be performed based on a predetermined communication scheme.

The processing shown in FIG. 4A is implemented by the control unit 101 of the smartphone 100 executing a control program provided by an application, and controlling the constituent elements of the smartphone 100. It is assumed that the application includes the control program for using the basic functions of the OS installed on the smartphone 100. The OS of the smartphone 100 may include the control program for implementing the processing according to the present embodiment. The same applies to FIGS. 8 and 10, which will be described later.

First, processing performed by the control unit 101 when the smartphone 100 searches for projectors 200 will be described with reference to FIG. 4A. The control unit 101 starts searching for projectors in the network in response to the user performing an operation such as touching a menu or the like displayed on the display unit 106 of the smartphone 100.

Figure 5A:
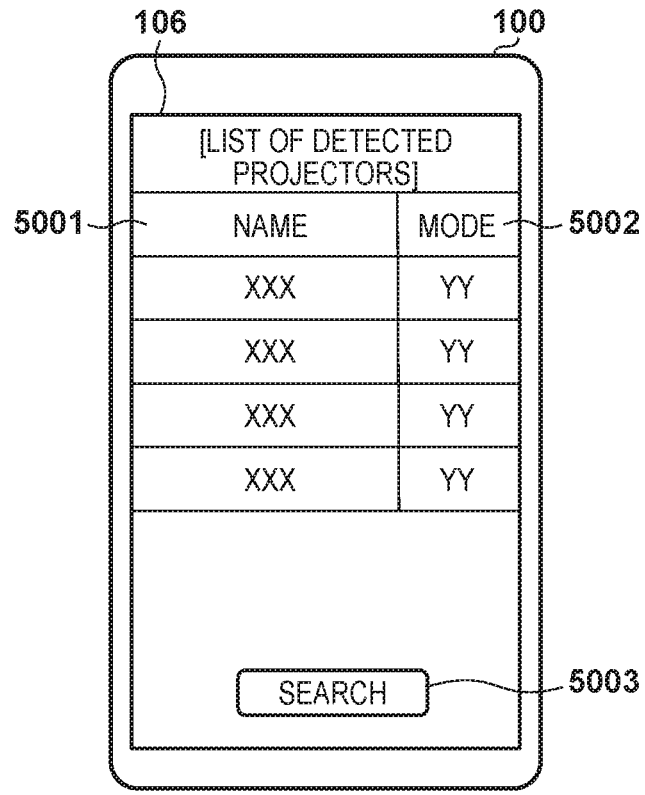
FIGS. 5A and 5B are diagrams showing an example of a UI screen of the smartphone according to the first embodiment displayed when connected to projectors.
Figure 5B:
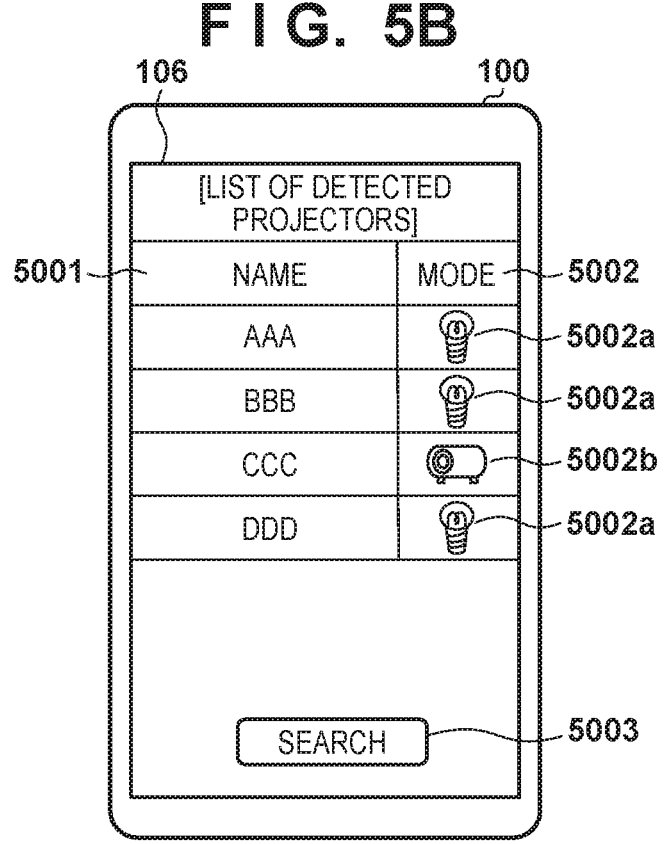

FIGS. 5A and 5B show an example of a UI screen of the smartphone 100, the UI screen being a search screen, with FIG. 5A showing the UI screen displayed before searching for projectors, and FIG. 5B showing the UI screen on which a list of projectors detected as a result of searching for projectors is displayed. In FIGS. 5A and 5B, reference numeral 5001 indicates a name display section, reference numeral 5002 indicates a mode display section for displaying operation modes, and reference numeral 5003 indicates a button icon for the user to provide an instruction to start a search. In response to the user touching the search button 5003, the control unit 101 starts search processing for searching for projectors that belong to the same subnet range. Then, the control unit 101 displays, as the result of the search, projector names in the name display section 5001, and image icons 5002a and 5002b that correspond to the operation modes of the projectors in the mode display section 5002.

In S401, an interruption to the control unit 101 occurs, and the control unit 101 transmits a search command via the communication unit 104 based on a button (object) touched by the user. The communication method used here may be any method as long as communication can be carried out with the addition of, for example, information such as a User Datagram Protocol (UDP). The control unit 101 may designate a broadcast address as the transmission destination of the search command, set the IP address, port number, and the like of the smartphone 100 in a payload unit, and distribute a search request to an apparatus that is present in the same subnet.

In S402, the control unit 101 waits for a response to the search command from a projector 200. Here, it is assumed that processing is performed in a loop from S402 to S405, which will be described later, and the processing is terminated when a search cancel button (not shown) displayed after the start of search is pressed by the user. If it is detected that the control unit 101 has received a response via the communication unit 104, the processing is advanced to S403.

In S403, the control unit 101 transmits a state information request command to the projector 200 from which the response was received via the communication unit 104.

In S404, the control unit 101 waits for a response to the state information request command from the projector 200. If the control unit 101 receives a response via the communication unit 104, the processing is advanced to S405.

In S405, the control unit 101 reads out the name of the projector 200 and the operation mode information (described later) from the state information received via the communication unit 104, and writes them into the RAM 102. The control unit 101 reads out image icon data associated with each operation mode from the ROM 103 based on the read-out operation mode information. The control unit 101 controls the display control unit 107 to render the image icon data and the name of the projector 200 that have been read out in predetermined positions.

Next, a sequence performed by the control unit 201 of the projector 200 when received a search command will be described with reference to FIG. 4B.

The processing shown in FIG. 4B is implemented by the control unit 201 of the projector 200 writing a control program stored in the ROM 203 into the RAM 202, and executing the control program. The same applies to FIGS. 10A to 10C, which will be described later.

In S411, the control unit 201 is in a command waiting state in which the control unit 201 is waiting for a search command to be received. In the present embodiment, it is assumed that the projector 200 transitions to the command waiting state when the projector 200 transitions to the standby mode. If the control unit 201 receives a search command via the communication unit 204, the processing is advanced to S412.

In S412, the control unit 201 writes the received data into the RAM 202, and returns response information indicating the presence of the projector 200 to the smartphone 100 via the communication unit 204 based on the IP address, port number, and the like of the transmission source that are contained in the received data.

In S413, the control unit 201 enters a state information request command waiting state, and if the control unit 201 receives a request command, the processing is advanced to S414.

Figure 6:
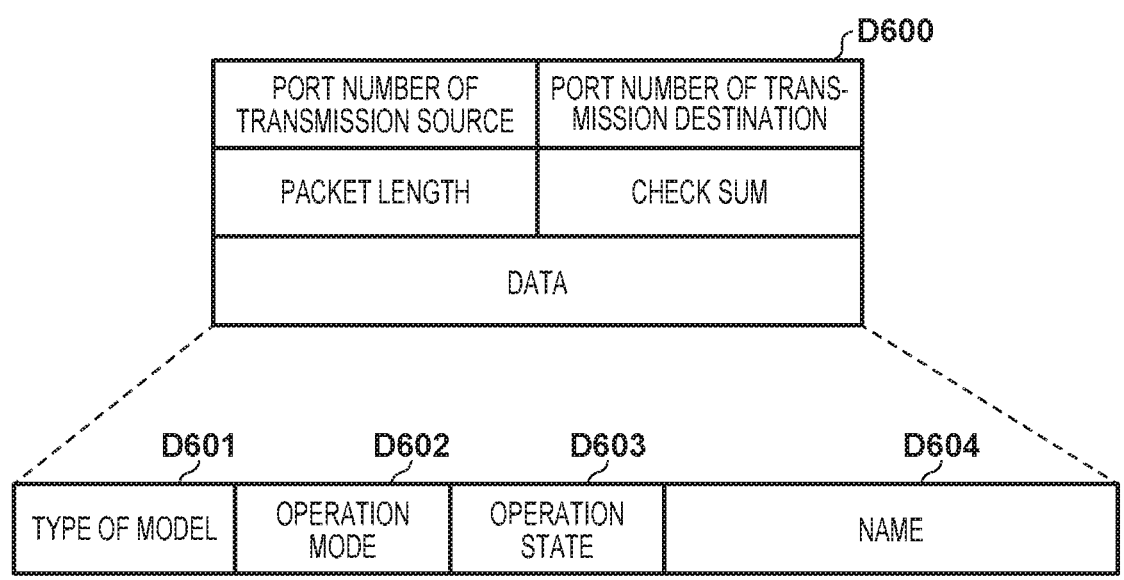
FIG. 6 is a diagram showing an example of communication data used when the smartphone and the projector according to the first embodiment are connected.

In S414, the control unit 201 transmits data shown in FIG. 6 to the smartphone 100 via the communication unit 204. FIG. 6 shows an example of a data structure that is transmitted to the smartphone 100 in S414. Reference numeral D600 indicates a data structure in the UDP, and reference numerals D601 to D604 indicate state information and the like of the projector 200. Reference numeral D601 is information indicating the type of model, and is a portion of data that can indicate, for example, "the projection function and the lighting function are available", "only the projection function is available", "only the lighting function is available", and the like. Reference numeral D602 is information indicating the operation mode, and is a portion of data that can indicate, for example, "projection mode", "lighting mode", "standby mode", and the like. Reference numeral D603 is information indicating the operation state, and is a portion of data that can indicate, for example, a more detailed state in each operation mode such as "projection on", "projection off", "lighting on", and lighting off. As used herein, "projection on" refers to the state in which image data is projected in the projection mode, and "lighting on" refers to the state in which light emitted from the light source 223 is diffused. Likewise, "projection off", and "lighting off" refer to the state in which in the projection mode and the lighting mode, the light source is controlled to stop light irradiation. Reference numeral D604 is information indicating the name of the projector 200, and is a portion of data that can indicate the individual name that has been set in advance by the user. The control unit 201 of the projector 200 reads out various types of information including the data structure described above from the RAM 202 and the ROM 203, and transmits them as a set of data to the smartphone 100 via the communication unit 204.

An example of the UI screen displayed after a search has been performed by the smartphone 100 will be described next with reference to FIGS. 7A to 7C.

First, the elements that are the same in FIGS. 7A to 7C will be described. In FIGS. 7A to 7C, reference numeral 7001 indicates a name display section, reference numeral 7002 indicates a mode display section for displaying operation modes, and reference numeral 7003 indicates a button icon for the user to provide an instruction to start a search. In the name display section 7001, name information transmitted from each projector 200 is displayed. In the mode display section 7002, an image icon corresponding to the operation mode of each projector is displayed. FIGS. 7A to 7C show an example of the UI screen displayed in the case where six projectors, namely, projectors 200A to 200F, have been found as a result of search. If name "AAA" and operation mode "lighting" are received from the projector 200A, an image icon 7002a corresponding to "lighting" is displayed in the mode display section 7002. If, for example, name "CCC" and operation mode "projection" are received from the projector 200C, an image icon 7002b corresponding to "projection" is displayed in the mode display section 7002. If name "FFF" and operation mode "standby" are received from the projector 200F, an image icon 7002c corresponding to "standby" is displayed in the mode display section 7002. The projector search performed by the smartphone 100 described here is performed in response to an instruction to start a search provided by the user, but a configuration is also possible in which, for example, while the application installed on the smartphone 100 is running, the program automatically searches for projectors in a periodical manner, and displays the result of search on the UI screen as appropriate.

A description will now be given of a display form of the UI screen displayed on the display unit 106 of the smartphone 100 based on the information received from the projectors 200.

FIG. 7A is an example of the UI screen in which the operation state information corresponding to D603 shown in FIG. 6 has been reflected. In the mode display section 7002, image icons corresponding to the operation modes of the projectors whose names are "CCC" and "DDD", respectively, are displayed as grayed out in an identifiable manner, the image icons representing that the operation states of the projectors 200C and 200D are "projection off" and "lighting off", respectively. Image icons corresponding to the operation modes of the projectors whose names are "AAA" and "BBB", respectively, are not grayed out, and thus the image icons represent that the operation states of the projectors 200A and 200B are "projection on" and "lighting on", respectively. This UI screen alternatively presents, for each projector, the operation state in which the projector is operating with the projection function, or the operation state in which the projector is operating with the lighting function.

FIG. 7B is an example of the UI screen in which the model type information corresponding to D601 shown in FIG. 6 has been reflected. In the mode display section 7002, the image icon 7002a indicates that the projector has the lighting function, and the image icon 7002b indicates that the projector has the projection function. In the mode display section 7002, the projectors 200A and 200B whose names are "AAA" and "BBB", respectively, are of a type of model that is "the projection function and the lighting function are available", and thus the image icons 7002a and 7002b are displayed in the mode display section 7002. If the operation mode is not "projection mode", the image icon 7002b corresponding to the projection mode is grayed out, and if the operation mode is not "lighting mode", the image icon 7002a corresponding to the lighting mode is grayed out. In this way, the image icons 7002a and 7002b are displayed in an identifiable manner.

FIG. 7C is an example of the UI screen in which the projectors found as a result of search are sorted according to the operation mode based on the operation mode information corresponding to D602 shown in FIG. 6. In FIG. 7C, the projectors are sorted in the order of, from the top, the projection mode, the lighting mode, and the standby mode. In the mode display section 7002, the image icon 7002b corresponding to the projection mode is presented for each of the projectors 200A, 200D, and 200E whose names are "AAA", "DDD", and "EEE", respectively. Likewise, the image icon 7002a corresponding to the lighting mode is presented for each of the projectors 200B and 200C whose names are "BBB" and "CCC", respectively. Likewise, the image icon 7002c corresponding to the standby mode is presented for the projector 200F whose name is "FFF".

The screens shown in FIGS. 7A to 7C described above may be switched by a user operation, or only at least one of the screens may be used, it is also possible to combine the items displayed in FIGS. 7A to 7C and display them in one screen. It is also possible to present the projectors by sorting them in descending order of most recent connection based on the connection history, connection date/time, and the number of connections of the projectors, or it is also possible to present the projectors in a predetermined order by sorting them in descending order of the number of connections.

Although not shown, in order to avoid connecting to a projector operating in an operation mode that is not intended by the user, a projector(s) in a specific operation mode (for example, the lighting mode) may be hidden on the display. In this case, in the UI screens shown in FIGS. 7A to 7C, control may be performed so as to exclude the projector(s) in the specific operation mode from a list of projectors that can be selected by the user. If the user selects one of the projectors listed and displayed on the UI screen, the control unit 101 establishes a connection to the selected projector, and transfers image data to the connected projector, as a result of which the image data can be projected.

As described above, by controlling display of the UI screen according to the function information received from the projectors 200, it is possible to present the operation state of each projector found as a result of search, and it is therefore possible to reduce the problem of erroneously connecting to a projector operating in an operation mode that is not intended by the user.

Second Embodiment

Next, a second embodiment will be described.

In the first embodiment given above, an example was described in which the operation states of the projectors are displayed using image icons that correspond to their operation modes, but in the present embodiment, an example will be described in which a projector to which the user desires to connect is selected, and thereafter, the operation mode of the selected projector is notified on the UI screen. The following description will be given focusing on differences from the first embodiment.

FIG. 8 shows a sequence of UT screen display control processing performed by the control unit 101 after the smartphone 100 has searched for a projector 200.

The processing starts when a projector to the user desires to connect is selected by the user performing an operation such as touching the display unit 106 of the smartphone 100.

In S801, if the control unit 101 receives an operation signal for selecting the projector via the operation unit 105 by a user operation performed on the display unit 106, the processing is advanced to S802.

In S802, the control unit 101 reads out the operation mode information of the selected projector from the RAM 102, and determines whether the operation mode information indicates the lighting mode. It is assumed that this information has been written into the RAM 102 by the control unit 101 at the timing when it is received from the communication unit 104 during projector search. If it is determined that the operation mode information indicates the lighting mode, the control unit 101 advances the processing to S803.

In S803, the control unit 101 reads out, from the ROM 103, UI data 9004 for prompting the user to confirm the connection as shown in FIG. 9, and controls the display control unit 107 to display the UI data 9004 on the display unit 106 in the form of a UI screen. The UI screen shown in FIG. 9 shows the UI data 9004 including image icons and character strings asking the user to again confirm whether or not to connect to the projector, and also presents options of "YES" and "NO". If "YES" is pressed by the user, the control unit 101 starts connection processing of connecting to the selected projector, and the projector 200 causes its operation mode to transition from the lighting mode to the projection mode so as to be ready to display image data transferred from the smartphone 100. If "NO" is pressed, the control unit 101 may enter a state in which the result of another search is displayed on the UI screen, without performing connection processing. If it is determined in S802 that the operation mode of the selected projector does not indicate the lighting mode, the control unit 101 starts connection processing without displaying the UI screen shown in FIG. 9.

As described above, by performing control so as to display the UI screen according to the operation mode of the selected projector, it is possible to reduce the problem of erroneously connecting to a projector in a state that is not intended by the user.

Third Embodiment

Hereinafter, a third embodiment will be described.

In the second embodiment, an example was described in which the UI screen for prompting the user to confirm whether to connect to the selected projector is displayed according to the operation mode of the projector, but in the present embodiment, an example will be described in which the UI screen is displayed so as to notify the operation mode even after a connection has been established. The following description will be given focusing on differences from the first embodiment.

The smartphone 100 and the projector 200 according to the present embodiment have the same configurations as those shown in FIGS. 2A and 2B.

Figure 10A:
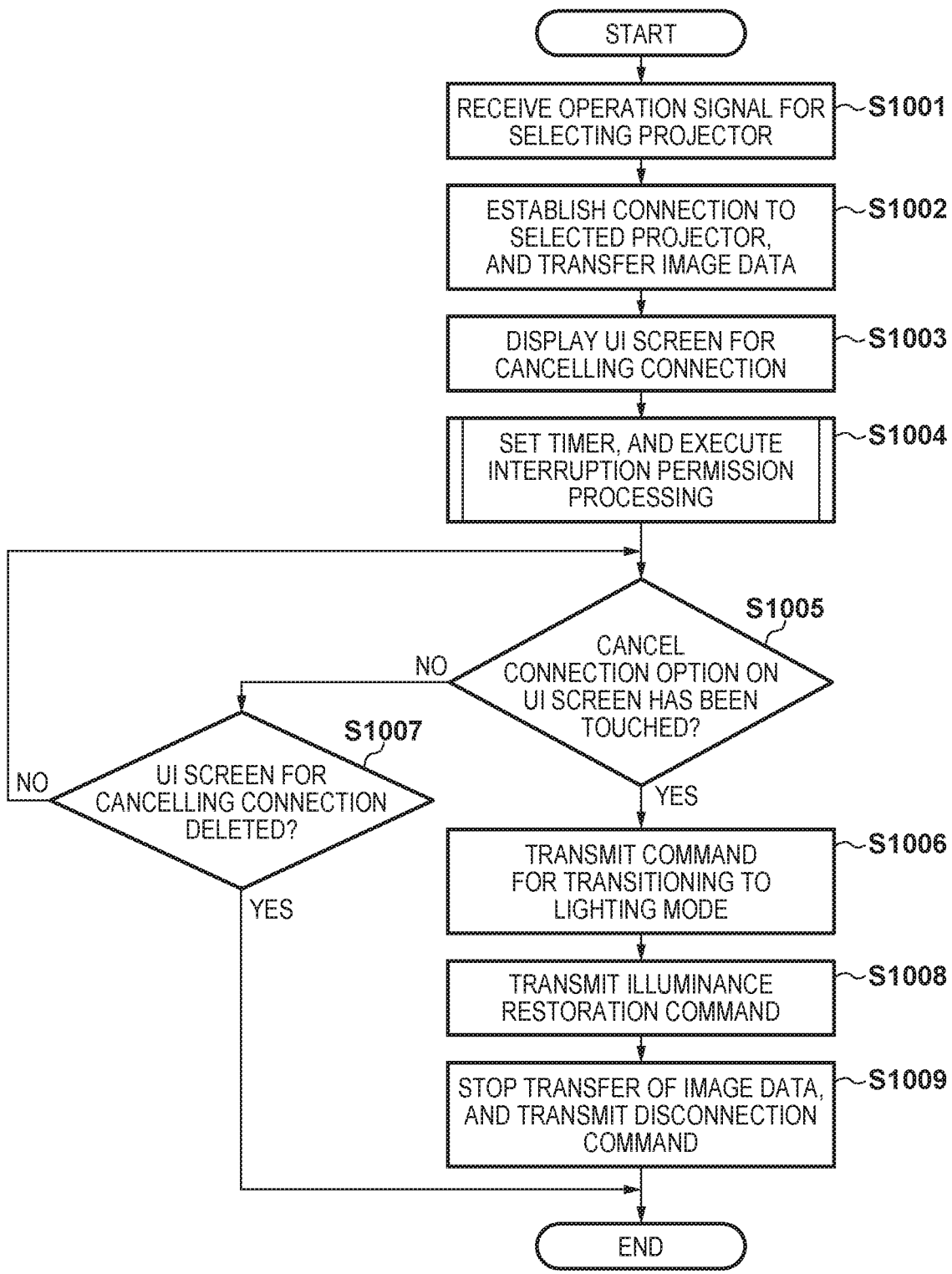

FIGS. 10A and 10B show a sequence of UI screen display control processing performed by the control unit 101 after a projector to which the user desires to connect has been selected via the UI screen.

In S1001, the control unit 101 receives an operation signal for selecting the projector via the operation unit 105 by a user operation performed on the display unit 106, and advances the processing to S1002.

In S1002, the control unit 101 starts connection processing of connecting to the selected projector and transmission of image data via the communication unit 104.

Figure 11:
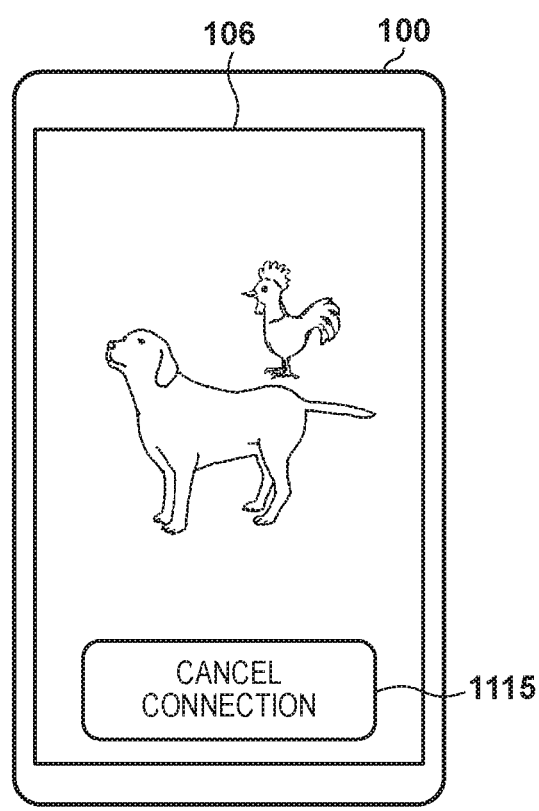
FIG. 11 is a diagram showing an example of a UI screen of the smartphone according to the third embodiment displayed when connected to the projector.

In S1003, the control unit 101 reads out image icon data for cancelling the connection from the ROM 103, and controls the display control unit 107 to display the UI screen on the display unit 106. FIG. 11 shows an example of display of the UI screen for cancelling the connection, and an option 1115 "cancel connection" is presented.

In S1004, the control unit 101 sets the timer to a predetermined length of time, and executes interruption permission processing in an interruption control block (not shown) provided in the control unit. The interruption permission processing will be described with reference to FIG. 10B. In response to the start of the interruption permission processing, a signal is output from the interruption control block provided in the control unit. In S1010, the control unit 101 determines whether a predetermined length of time has elapsed by using the timer 228, and the control unit 101 skips the processing operations of S1011 and S1012, and advances the processing to S1005 until the predetermined length of time elapses. In S1011, the control unit 101 controls the display control unit 107 to delete the UI screen for receiving a connection cancellation. In S1012, the control unit 101 outputs an interruption prohibition signal to the interruption control block provided in the control unit, and advances the processing to S1005.

Reverting to FIG. 10A, in S1005, the control unit 101 determines whether an operation signal for cancelling the connection has been input via the operation unit 105 by a user operation. The control unit 101 advances the processing to S1006 if it is determined that the option "cancel connection" has been touched, and otherwise advances the processing to S1007.

In S1006, the control unit 101 transmits a command for transitioning to the lighting mode via the communication unit 104.

In S1007, the control unit 101 determines whether or not the UI screen for cancelling the connection has already been deleted through the interruption permission processing, and the control unit 101 returns the processing to S1005 if it is determined that the UI screen has not been deleted, and terminates the processing if it is determined that the UI screen has been deleted.

In S1008, the control unit 101 transmits an illuminance restoration command via the communication unit 104. In S1009, the control unit 101 ends the processing by stopping the transfer of image data and also transmitting a disconnection command via the communication unit 104. In S1008, control is performed so as to restore the illuminance from the smartphone 100 to the projector 200, but the projector 200 may restore the illuminance to the original illuminance. For example, when the projector 200 transitions from the lighting mode to the projection node, the projector 200 may store in the ROM 203 illuminance information set before the transition is made, and when the projector 200 returns to the lighting mode again, the projector 200 may read out the illuminance information from the ROM 203, and set the illuminance information in the light source 223.

In S1009, the control unit 101 ends the processing by stopping the transfer of image data and also transmitting a disconnection command via the communication unit 104.

Figure 10C:
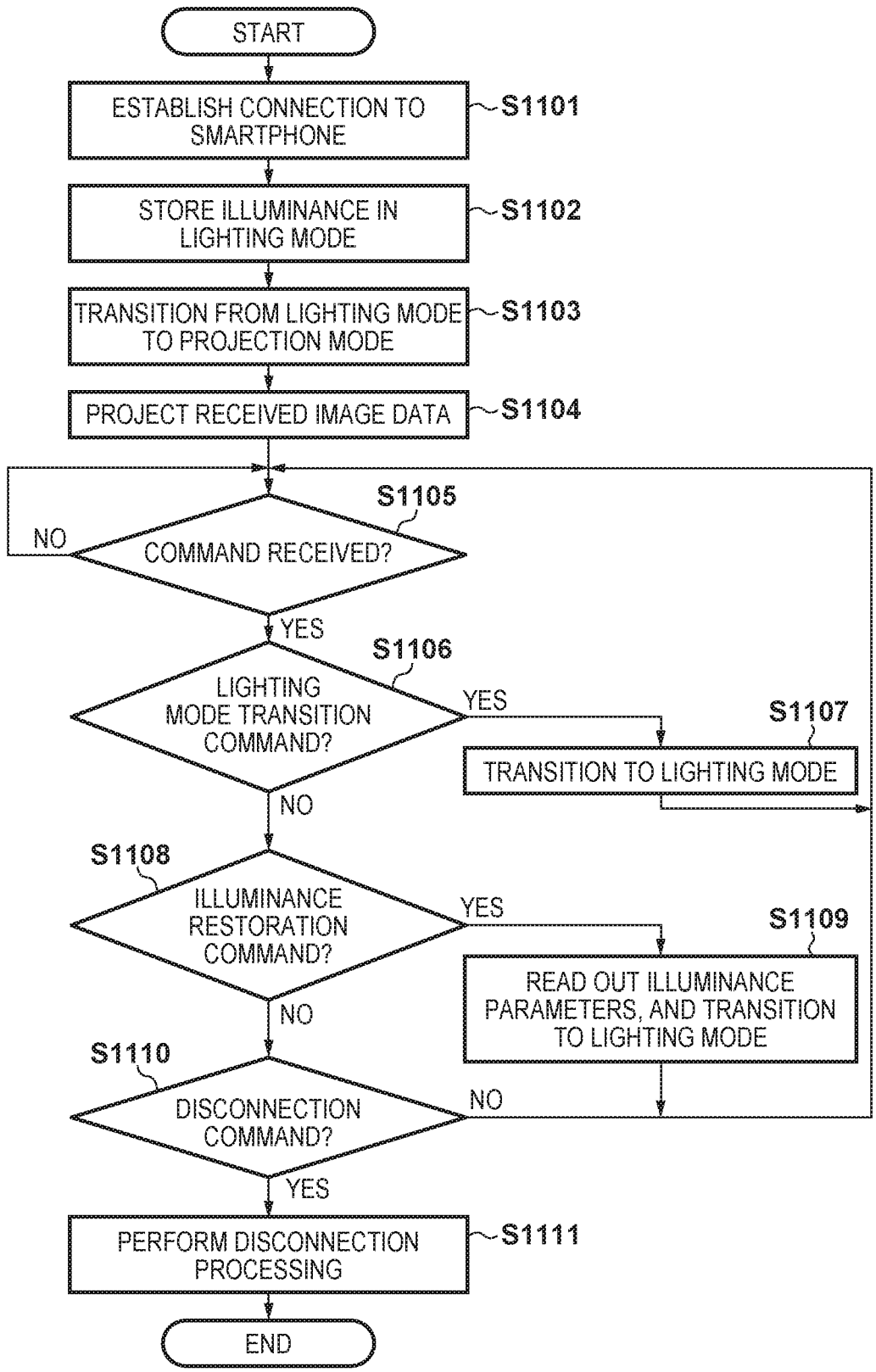
FIG. 10C shows a flowchart illustrating processing performed by the projector after connected to the smartphone according to the third embodiment.

Next, a sequence of control processing performed by the control unit 201 of the projector after the projector to which the user desires to connect has been selected via the UI screen will be described with reference to FIG. 10C.

In S1101, the control unit 201 establishes a connection to the smartphone 100 in response to receiving a request for establishing a connection from the smartphone 100.

In S1102, the control unit 201 writes, into the ROM 203, illuminance parameters that are currently set.

In S1103, the control unit 201 stops the output of diffusion light from the light source 223, controls the light source control unit 224 and the projection control unit 226 such that projection light is output from the projection unit 225, and changes the operation mode from the lighting mode to the projection mode.

In S1104, the control unit 201 controls the image processing unit 212 and the liquid crystal driving unit 222 so as to project image data received via the communication unit 204 from the smartphone 100, and in S1105, enters a command reception waiting state. In S1105, if the control unit 201 receives a command via, the communication unit 204 from the smartphone 100, the processing is advanced to S1106.

In S1106, the control unit 201 determines the type of command based on the data received from the smartphone 100, and the control unit 201 advances the processing to S1107 if it is determined that the command is a lighting mode transition command, and otherwise advances the processing to S1108.

In S1107, the control unit 201 transmits a control signal required for transitioning to the lighting mode to the constituent blocks of the smartphone 100, and after that, returns to the command reception waiting state of S1105.

In S1108, the control unit 201 determines the type of command based on the data received from the smartphone 100, and the control unit 201 advances the processing to S1109 if it is determined that the command is an illuminance restoration command, and otherwise advances the processing to S1110.

In S1109, the control unit 201 reads out the illuminance parameters written in the ROM 203 into the RAM 202, and controls the light source control unit 224 based on the read-out illuminance, and after that, returns to the command reception waiting state of S1105.

In S1110, the control unit 201 determines the type of command based on the data received from the smartphone 100, and the control unit 201 advances the processing to S1111 if it is determined that the command is a disconnection command, and otherwise returns to the command reception waiting state of S1105.

In S1111, the control unit 201 controls the communication unit 204 so as to perform disconnection processing of disconnecting from the smartphone 100, and terminates the processing.

As described above, after a connection to a projector in the lighting mode has been established, the UI screen for cancelling the connection is displayed, as a result of which the influence caused by switching the mode from the lighting mode to the projection mode can be suppressed at the earliest stage possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-095846, filed May 12, 2017, and No. 2018-023409, filed Feb. 13, 2018 which are hereby incorporated by reference herein in their entirety.

What is claimed is:

1. An information processing apparatus that is capable of externally controlling a projection apparatus, the information processing apparatus comprising:
   a communication interface configured to perform communication with the projection apparatus;
   an acquiring unit configured to acquire function information of the projection apparatus from the projection apparatus via the communication interface;
   a presenting unit configured to present the function information of the projection apparatus acquired by the acquiring unit; and
   a control unit configured to control the presenting unit so as to present an indication of whether the projection apparatus is operating with a projection function or with a lighting function based on the function information of the projection apparatus acquired by the acquiring unit,
   wherein at least one processor functions as the acquiring unit, the presenting unit and the control unit.

2. The apparatus according to claim 1,
   wherein the control unit is configured to control the presenting unit so as to alternatively present an operation state in which the projection apparatus is operating with the projection function, or an operation state in which the projection apparatus is operating with the lighting function.

3. The apparatus according to claim 1, wherein the processor functions as a search unit configured to search for projection apparatuses with which the communication interface can perform communication,
   wherein the control unit is configured to perform control so as to display a list of functions of the projection apparatuses found by the search unit and operation states of the functions on a projection apparatus-by-projection apparatus basis.

4. The apparatus according to claim 3,
   wherein the control unit is configured to perform control so as to display, for each of the projection apparatuses found by the search unit, whether the projection apparatus is operating with the projection function or the lighting function.

5. The apparatus according to claim 3,
   wherein the control unit is configured to perform control so as to display the functions of the projection apparatuses found by the search unit and the operation states of the functions by sorting according to the functions.

6. The apparatus according to claim 3,
   wherein the control unit is configured to, if one of the projection apparatuses found by the search unit does not have the lighting function, perform control so as to provide an identifiable display indicating that the projection apparatus does not have the lighting function.

7. The apparatus according to claim 4,
   wherein the control unit is configured to, if the projection apparatus is operating with the lighting function, perform control so as to not display the function information of the projection apparatus.

8. The apparatus according to claim 3, wherein the processor functions as a selection unit configured to be capable of selecting a projection apparatus to which a user desires to connect from among the projection apparatuses found by the search unit.

9. The apparatus according to claim 8,
   wherein the control unit is configured to provide a notification indicating that the projection apparatus selected by the user is operating with the lighting function before a connection to the information processing apparatus is established by the communication interface.

10. The apparatus according to claim 8,
    wherein the control unit is configured to provide a notification asking whether to perform a connection to the projection apparatus selected by the user before the connection to the information processing apparatus is established by the communication interface.

11. The apparatus according to claim 8,
    wherein the control unit is configured to, after a connection to the projection apparatus selected by the user has been established, present an indication for a predetermined time so as to be capable of accepting a user operation for cancelling the connection.

12. The apparatus according to claim 11,
    wherein the control unit is configured to, when a user operation for cancelling the connection is accepted, perform control so as to switch an operation mode of the projection apparatus with which the connection is disconnected to a lighting mode, and restore illuminance before the connection to the projection apparatus was established.

13. An information processing apparatus that is capable of externally controlling a projection apparatus, the information processing apparatus comprising:
    a communication interface configured to perform communication with the projection apparatus;
    an acquiring unit configured to acquire function information of the projection apparatus from the projection apparatus via the communication interface; and
    a display control unit configured to display, on a display device, an operation mode in which the projection apparatus is operating based on the function information of the projection apparatus acquired by the acquiring unit, the operation mode being one of a plurality of operation modes including a projection mode in which the projection apparatus uses its projection function and a lighting mode in which the projection apparatus uses its lighting function,
    wherein at least one processor functions as the acquiring unit and the display control unit.

14. The apparatus according to claim 13,
    wherein the plurality of operation modes include a standby mode.

15. The apparatus according to claim 14, wherein the processor functions as a search unit configured to search for projection apparatuses with which the communication interface can perform communication,
    wherein the display control unit is configured to perform control so as to display, on the display device, a list of operation modes of the projection apparatuses found by the search unit on a projection apparatus-by-projection apparatus basis.

16. A control method of an information processing apparatus that is capable of externally controlling a projection apparatus, the method comprising:
acquiring function information of the projection apparatus via a communication interface from the projection apparatus;
presenting the acquired function information of the projection apparatus;
performing control based on the acquired function information of the projection apparatus so as to present an indication of whether the projection apparatus is operating with a projection function or a lighting function.

17. A control method of an information processing apparatus that is capable of externally controlling a projection apparatus, the method comprising:
acquiring function information of the projection apparatus via a communication interface from the projection apparatus; and
displaying, on a display device, an operation mode in which the projection apparatus is operating based on the acquired function information of the projection apparatus, the operation mode being one of a plurality of operation modes including a projection mode in which the projection apparatus uses its projection function and a lighting mode in which the projection apparatus uses its lighting function.

18. A non-transitory computer-readable storage medium storing a program for causing a computer to execute a control method of an information processing apparatus that is capable of externally controlling a projection apparatus, the method comprising:
acquiring function information of the projection apparatus via a communication interface from the projection apparatus;
presenting the acquired function information of the projection apparatus; and
performing control based on the acquired function information of the projection apparatus so as to present an indication of whether the projection apparatus is operating with a projection function or a lighting function.

19. A non-transitory computer-readable storage medium storing a program for causing a computer to execute a control method of an information processing apparatus that is capable of externally controlling a projection apparatus, the method comprising:
acquiring function information of the projection apparatus via a communication interface from the projection apparatus; and
displaying, on a display device, an operation mode in which the projection apparatus is operating based on the acquired function information of the projection apparatus, the operation mode being one of a plurality of operation modes including a projection mode in which the projection apparatus uses its projection function and a lighting mode in which the projection apparatus uses its lighting function.

20. An information processing apparatus that is capable of externally controlling a projection apparatus, the information processing apparatus comprising:
communication means for performing communication with the projection apparatus;
acquiring means for acquiring function information of the projection apparatus from the projection apparatus via the communication means;
presenting means for presenting the function information of the projection apparatus acquired by the acquiring means; and
control means for controlling the presenting means so as to present an indication of whether the projection apparatus is operating with a projection function or with a lighting function based on the function information of the projection apparatus acquired by the acquiring means.

21. An information processing apparatus that is capable of externally controlling a projection apparatus, the information processing apparatus comprising:
communication means for performing communication with the projection apparatus;
acquiring means for acquiring function information of the projection apparatus from the projection apparatus via the communication means; and
display control means for displaying, on display means, an operation mode in which the projection apparatus is operating based on the function information of the projection apparatus acquired by the acquiring means, the operation mode being one of a plurality of operation modes including a projection mode in which the projection apparatus uses its projection function and a lighting mode in which the projection apparatus uses its lighting function.

* * * * *